M. Bliss.
Picking Machine.
N°. 101,218. Patented Mar. 29, 1870.

Witnesses:
Jno. D. Patten
Edmund Masson

Inventor:
Milton Bliss
By Atty A. B. Stoughton

UNITED STATES PATENT OFFICE.

MILTON BLISS, OF IONIA, MICHIGAN.

IMPROVEMENT IN MACHINES FOR PICKING AND DUSTING WOOL.

Specification forming part of Letters Patent No. 101,218, dated March 29, 1879.

*To all whom it may concern:*

Be it known that I, MILTON BLISS, of Ionia Village, in the county of Ionia and State of Michigan, have invented certain new and useful improvements in machines for picking and dusting wool and other animal and vegetable substances requiring such treatment; and I do hereby declare the following to be a full, clear, and exact description of the same, reference being had to the accompanying drawings, making a part of this specification, in which—

Figure 1:
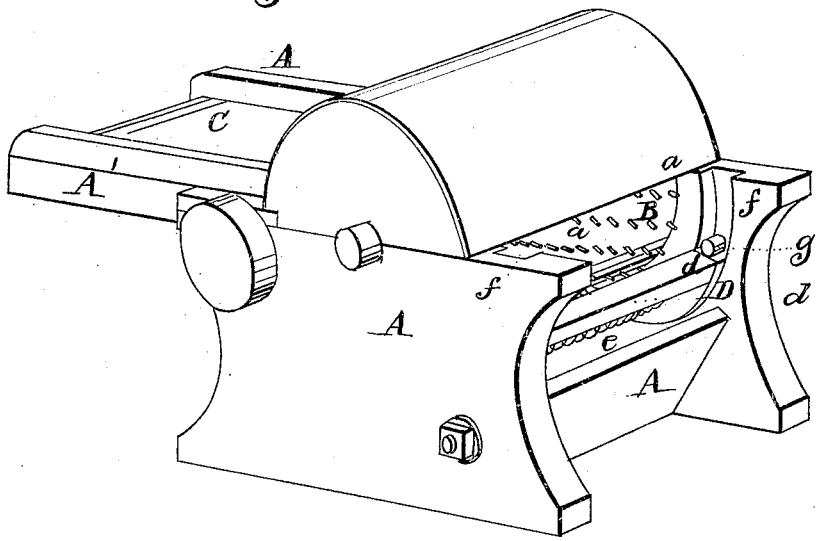
Figure 2:
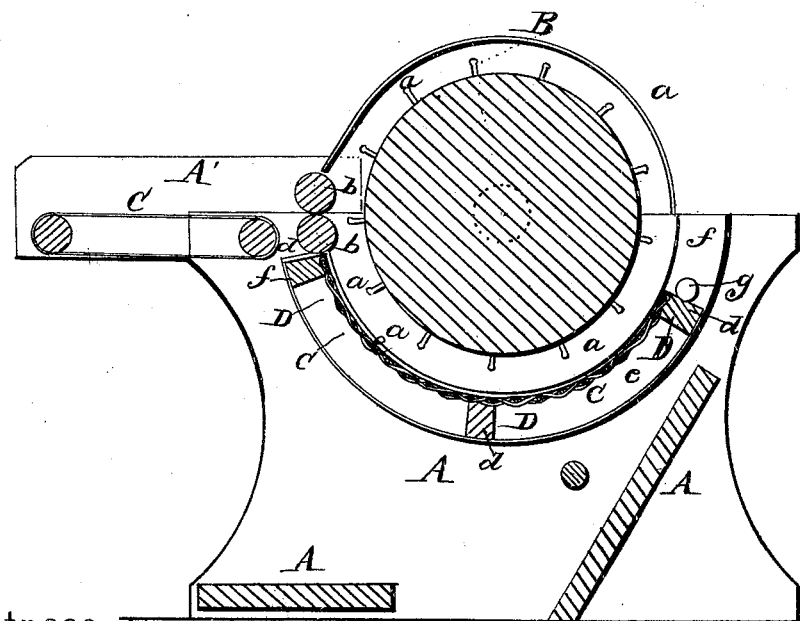

Figure 1 represents a perspective view of the machine. Fig. 2 represents a longitudinal vertical section through the same.

My invention consists in combining with a picking-cylinder a removable and replaceable sieve-rack or concave, which can be taken out or put in without the necessity of stopping the rotation of the cylinder.

To enable others skilled in the art to make and use my invention, I will proceed to describe the same with reference to the drawings.

The frame A may be made in any of the usual well-known ways, and in or on said frame is hung a picking-cylinder, B, furnished with teeth $a$ in the common way.

C is a feeding-belt arranged on the projecting frame-pieces A' A', and $b\ b$ feed-rollers for carrying in and holding the material to be operated upon, while the teeth of the picker take it in small quantities and loosen it up and carry it around to the delivery-point.

D is a portable and removable sieve-rack or meshed wire concave, which is a separate and distinct structure from the main frame and picker-cylinder. The side pieces, $c$, of this sieve-rack are formed in the arc of a circle, and are framed or held together by cross-pieces $d\ d\ d$, and the concave side of it covered with woven wire $e$, the meshes or interstices of which should be (as I have found by experience to be the best in practice) a half-inch square, or thereabout. In the adjacent sides of the main-frame side pieces are formed grooves, guides, or ways $f\ f$, concentric with the center of motion of the picker-cylinder B, and into or upon these grooves, guides, or ways the semicircular rack or meshed-wire concave is slipped, and held when in proper position by a pin or key, $g$.

When picking fleeces or ordinary marketable and dirty wool, the fiber is not only loosened up and straightened out, but is dusted or screened by passing over the meshed wire concave; and for working wool that has been dyed in the fleece it also loosens up the fiber, and also divests the wool of all the solid dye matter or substance.

When "waste" wool is to be worked, which is generally very greasy, then it may be necessary to take out the wire concave and put in another, so that, whether it be the ordinary wool of market, dyed wool, or waste wool, this machine is capable of working it speedily and thoroughly, and making but one single operation of the process. The concave may be held in place by the pin $g$. When it is to be removed, the pin or other catch is removed, and the concave can be drawn out without even stopping the picking-cylinder, only stopping the feed momentarily.

Having thus fully described my invention, what I claim therein as new, and desire to secure by Letters Patent, is—

The combination, in a picking-machine, of a picking-cylinder, feeding-rollers, and a removable and replaceable sieve, rack, or concave, such feeding mechanism being provided with a stopping mechanism, and the screen being arranged in circular ways or grooves, such as described, so that it may be removed or replaced while the cylinder is in motion, as and for the purposes set forth.

MILTON BLISS.

Witnesses:
 O. S. TOWER,
 G. T. D. WILER.